Aug. 29, 1933.                    M. O. SEM                    1,924,728
                               TREATMENT OF SLAG
                              Filed Feb. 24, 1930
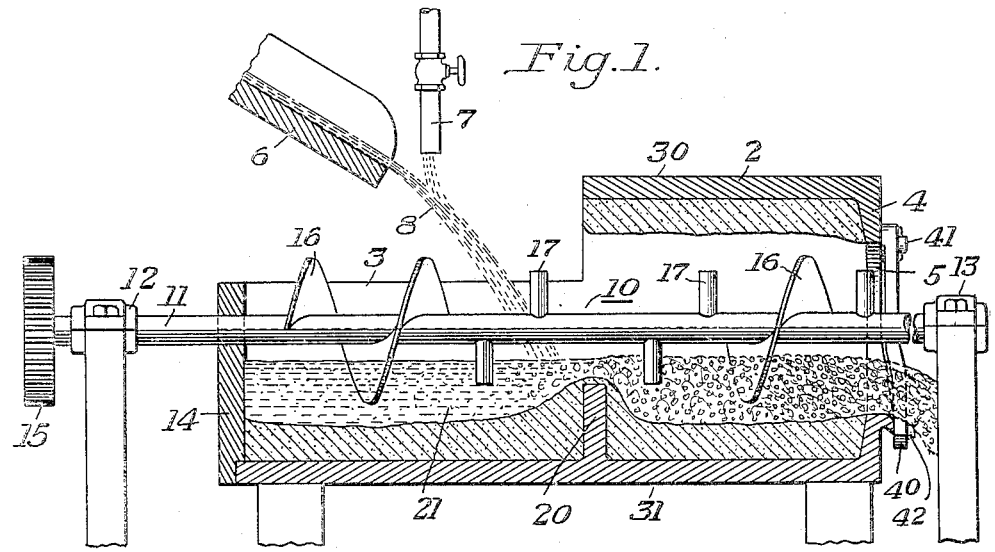
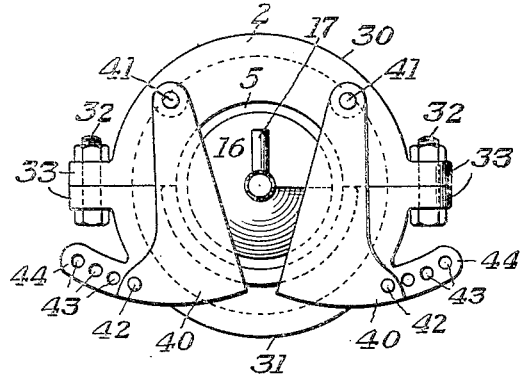 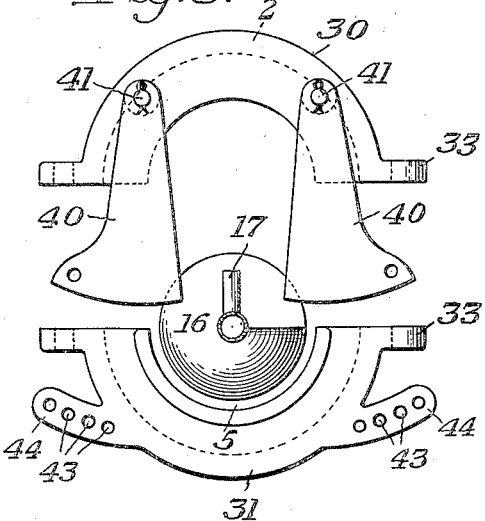
INVENTOR
Mathias Orvine Sem
by Byrnes, Stebbins, Parmelee & Blenko
Attys.

Patented Aug. 29, 1933

1,924,728

UNITED STATES PATENT OFFICE 1,924,728

TREATMENT OF SLAG

Mathias Ovrom Sem, Buffalo, N. Y., assignor to Tracy Bartholomew, Pittsburgh, Pa.

Application February 24, 1930, Serial No. 430,584, and in Norway February 27, 1929

9 Claims. (Cl. 49—77.5)

This invention relates generally to the treatment of slag and more particularly to a process and apparatus whereby slag products such as building blocks, bricks, or crushed slag for structural purposes may be made from molten slag, and in which the products have a porous or cellular structure.

In my prior United States Patents Nos. 1,458,858 and 1,471,421, granted June 12, 1923 and October 23, 1923, respectively, there are disclosed processes and apparatus for producing products of the type herein contemplated. According to my prior patents, molten slag is introduced into the bottom of a cylindrical foaming apparatus. Water is introduced adjacent the bottom of the foaming apparatus and this water vaporizes due to the heat of the slag. The mixture of slag and water is stirred by a stirrer which extends into the foaming apparatus in a substantially vertical position. The liquid foam produced by the stirrer and the vaporized water flows upwardly through the foaming apparatus and is discharged adjaccent the top thereof. The foam flowing from the foaming apparatus may be cast directly into molds in which it cools or may be cooled by passing it through water cooled rollers prior to introducing it into the molds.

In either of the above referred to patents, the molten slag enters the foaming apparatus at the bottom and the foam is discharged at the top. It was formerly believed necessary to keep the foam which had already been produced separate from the incoming slag which had not yet been treated. I have found, however, that this separation of the foam and incoming slag is not necessary and that the water may be mixed with the slag prior to introducing the mixture into the foaming apparatus. When using the apparatus disclosed in my prior patents, if the input of slag into the foaming apparatus is stopped for any reason, the level of the slag below the stirrer falls so that the stirring apparatus is not effective for forming foam. The flow of foam from the outlet of the apparatus accordingly ceases and the molten slag below the stirrer freezes. It is necessary that this frozen slag be removed from the foaming apparatus before the operation can be started again. Since the apparatus had a refractory lining, it was very difficult to remove the frozen slag without also removing the refractory lining.

The disadvantages incident to supplying molten slag at the bottom of the foaming apparatus and withdrawing foam from the top of the apparatus are eliminated according to the present invention. The molten slag alone, or a mixture of molten slag and water, is introduced into the foaming apparatus from a point above the apparatus. The foaming apparatus is preferably cylindrical in shape and is arranged so that its longitudinal axis extends substantially horizontally. It is provided with a stirrer which extends axially of the foaming apparatus and is so constructed that it conveys the foam continuously through the apparatus to the discharge opening. If, for any reason, the input of slag ceases, the stirrer continues to rotate and continues to convey the slag already in the apparatus and the foam which has been formed through the apparatus to the outlet opening from which it is discharged. Accordingly, it is not necessary to clean out the apparatus each time after the operation has been interrupted.

The foaming apparatus, instead of being formed of a metallic casing provided with a refractory lining, is made entirely of metal. The slag solidifies on the inside of the metallic lining during the slag-treating operation and in this way itself forms a lining for the container.

The foaming apparatus is split longitudinally into a plurality of parts, which are bolted together to form a cylinder. If it becomes necessary after long usage to clean out the apparatus, the two parts are separated and the slag can easily be removed from the metal container.

In the accompanying drawing, which illustrates the present preferred form of my invention, Figure 1 is a longitudinal section of the foaming apparatus;

Figure 2 is an end elevation; and

Figure 3 illustrates the position of the halves of the apparatus when separated so as to clean out the accumulated slag.

Referring more particularly to the accompanying drawing, the foaming apparatus comprises a cylindrical casing 2 made out of metal such, for example, as cast iron. Other materials which are capable of withstanding the temperature to which the apparatus is subjected may be used if desired. The upper left hand portion of the cylinder, as viewed in Figure 1, is cut away to provide an inlet opening 3 for the slag which is to be treated. The right hand end of the container is partially closed by an inwardly extending flange 4 so as to provide an outlet opening 5 through which the treated slag is delivered. The molten slag is introduced through the opening 3 from a spout 6, which ordinarily is supplied with slag from a container not shown. As illustrated in Figure 1, water from a pipe 7 is mixed with the stream 8 of molten slag prior to introducing the mixture into the foaming apparatus. If desired, the water may be introduced separately into the foaming apparatus.

The container 2 is provided with a stirrer 10, the shaft 11 of which extends axially of the container and is supported in bearings 12 and 13. The shaft extends through plate 14 at the left hand end of the container. The shaft is rotated through a gear 15 by any desired means. The shaft is provided with screw elements 16 at its ends which, upon rotation of the shaft, convey the slag and foam to the outlet opening 5. The shaft also has arms 17 connected thereto, which agitate the mixture of slag and water to form foam. The bottom of the container is provided with a dam 20, which insures that the bath 21 of molten slag will be brought into contact with the stirring arms 17 in order to produce foam.

As shown in Figure 2, the container 2 is split longitudinally into an upper half 30 and a lower half 31 which are secured together by bolts 32 extending through flanges 33 on the upper and lower halves. The upper and lower halves may be separated as indicated in Figure 3 in order to remove accumulated slag.

It is sometimes desirable to adjust the size of the outlet opening of the foaming apparatus. This is accomplished according to the present invention by providing plates 40 which are pivoted at their upper ends on pins 41. The plates 40 are maintained in adjusted position by pins 42, each of which extends through an opening in the plate and one of a series of openings 43 provided in a lug 44 on the lower half 31 of the container. It is desirable to adjust the size of the outlet opening according to the type of slag which is being fed and the speed at which the stirrer is rotated.

The present invention provides a process in which the molten slag is mixed with water either prior to its introduction into the foaming apparatus or subsequently thereto. The liquid foam already produced and the new slag or mixture of slag and water which has not yet been treated to form foam is allowed to intermingle and the foam is positively conveyed by mechanical means to the outlet of the foaming apparatus. If the input of slag stops, the stirrer is kept in operation until the apparatus clears itself from the slag, and in this manner when it is desired to again resume operations it is necessary simply to introduce more slag. The provision of the dam 20 insures that no slag will flow through the foaming apparatus without being agitated by the arms 17. The stirrer shaft and arms and screw elements are water cooled by means not shown in order to enable them to withstand the temperature to which they are subjected.

The apparatus and process above described are intended particularly for the treatment of slag from blast furnaces. However, other slags may be employed, either natural furnace slags or artifically prepared slags, and it is, therefore, to be understood that the term "slag" is intended as a term of general definition and not of limitation, and to include various materials which may be artifically made and having the characteristics of slag. I have illustrated and described the present preferred form of apparatus and method for carrying out my invention. It is to be understood, however, that the invention may be otherwise embodied or practiced within the scope of the following claims.

I claim:

1. The process of treating molten slag, which comprises introducing molten slag and water into a foaming apparatus, agitating substantially the entire body of molten slag to produce foam, and solidifying the discharged foam to form a porous solid body.

2. The process of treating molten slag, which comprises agitating in a foaming apparatus substantially the entire body of molten slag to which water has been added, thereby producing liquid foam, and solidifying the discharged foam to form a porous solid body.

3. The process of treating molten slag, which comprises introducing molten slag and water into a foaming apparatus, agitating substantially the entire body of molten slag and conveying it in a substantially horizontal direction, thereby producing liquid foam, and solidifying the discharged foam to form a porous solid body.

4. The process of treating molten slag, which comprises adding water thereto, thereafter introducing it into a foaming apparatus and agitating it to form liquid foam, discharging the foam, and solidifying it.

5. The process of treating molten slag, which comprises supplying molten slag and water to a foaming apparatus, agitating it to produce liquid foam, discharging the foam at a lower elevation than the point at which the slag was supplied to the foaming apparatus and solidifying it.

6. The process of treating molten slag, which comprises agitating molten slag and water in a foaming apparatus to produce foam, flowing the liquid foam substantially horizontally through the apparatus, discharging the foam, and solidifying it.

7. The process of treating molten slag, which comprises introducing molten slag and water into a foaming apparatus from above the apparatus, agitating it to produce liquid foam, flowing the foam substantially horizontally through the apparatus, discharging the foam, and solidifying it.

8. Apparatus for treating molten slag, which comprises a container provided with an inlet and an outlet and having its axis extending in a non-vertical position, a stirrer in the container, means for rotating the stirrer, means for supplying molten slag to the container, a pipe arranged to supply water adjacent the top of the container, the top of the container adjacent the point of supply of the water to the molten slag being open in order to prevent clogging of the apparatus due to any solid slag which may form.

9. Apparatus for treating molten slag, which comprises a substantially horizontal container provided with an inlet and an outlet, a stirrer in the container, means for rotating the stirrer, means for supplying molten slag to the container, a pipe arranged to supply water adjacent the top of the container, the top of the container adjacent the point of supply of the water to the molten slag being open in order to prevent clogging of the apparatus due to any solid slag which may form.

MATHIAS OVROM SEM.